G. E. MOLYNEUX.
POWER TRANSMISSION MECHANISM.
APPLICATION FILED MAR. 12, 1908.
967,950.
Patented Aug. 23, 1910.
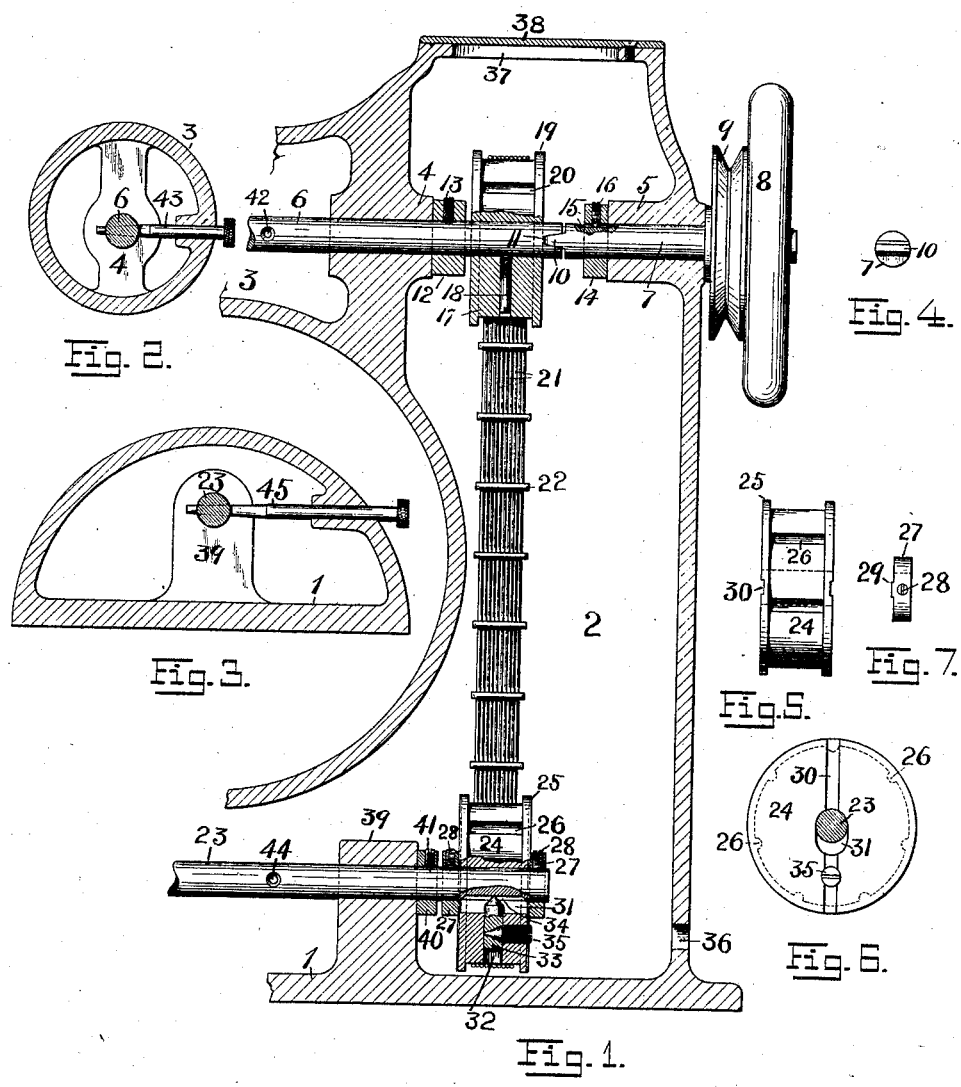
WITNESSES:
INVENTOR.
George E. Molyneux
BY
ATTORNEY.

UNITED STATES PATENT OFFICE.

GEORGE E. MOLYNEUX, OF ELIZABETH, NEW JERSEY, ASSIGNOR TO THE SINGER MANUFACTURING COMPANY, A CORPORATION OF NEW JERSEY.

POWER-TRANSMISSION MECHANISM.

967,950.  Specification of Letters Patent.  Patented Aug. 23, 1910.

Application filed March 12, 1908. Serial No. 420,533.

*To all whom it may concern:*

Be it known that I, GEORGE E. MOLYNEUX, a citizen of the United States, residing at Elizabeth, in the county of Union and State of New Jersey, have invented certain new and useful Improvements in Power-Transmission Mechanism, of which the following is a specification, reference being had therein to the accompanying drawings.

This invention relates to an improvement in power transmission mechanism, and it is especially applicable to sewing machines comprising two parallel shafts each carrying pulleys operatively connected for rotation in the same direction by means of a belt in the form of an endless band.

The invention has for its primary object to facilitate the renewal of the belt as occasion may require when encircling a pulley mounted upon a shaft which extends between two spaced bearings intermediate which the pulley is located; and the invention consists essentially in forming the shaft carrying such pulley in two sections which are joined intermediate the bearings, one shaft-section being adapted for withdrawal endwise to enable the belt, when removed from the pulley, to be passed between the other shaft-section and the bearing for the first-named shaft-section for introduction or removal of the belt.

The present improvement is designed particularly for embodiment in sewing machines having a bracket-arm provided with a hollow upright portion in which the operative connections between the shafts is inclosed.

The invention will be understood by reference to the accompanying drawings, in which—

Figure 1 is a longitudinal sectional elevation of the rearward portion of a sewing machine frame embodying the present improvement, Fig. 2 a transverse section of the horizontal portion of the bracket-arm of the machine in which is journaled the main or driving shaft, and Fig. 3 a similar section of the base or work-supporting horn. Fig. 4 is an inner end view of the driving section of the main-shaft. Fig. 5 is an edge view and Fig. 6 a face view of the lower belt-pulley, and Fig. 7 an edge view of one of the driving collars of the lower belt pulley.

As herein represented, the machine is constructed with a frame comprising the bed or work-supporting horn 1 and an integral bracket-arm comprising the hollow columnar upright portion 2 and the hollow horizontal portion or arm 3. The upright portion 2 of the frame is provided with the integral bearings 4 and 5 disposed in alinement, the former forming the rearward supporting bearing for the driven main-shaft section 6, and in the rearward bearing 5 is journaled the driving section 7 of the main-shaft, which carries the balance wheel 8 and the connected grooved pulley 9 through which power is transmitted in a manner well-known from a suitable source of power.

The shaft-sections 6 and 7 are detachably connected together by means of a coupling which, as shown herein, comprises a diametrically disposed wedge-shaped tongue 10 upon the inner end of the shaft-section 7 which is fitted to and adapted to enter a diametrical socket or recess 11 of corresponding shape in the rearward end of the shaft-section 6. The section 6 is provided with a thrust collar 12 secured thereon by means of a set-screw 13 abutting against the rearward end of the bearing boss 4, and the section 7 is similarly provided with a thrust collar 14 and has a longitudinal groove 15 in one side which is entered by the point of the set-screw 16, the collar 14 resting against the forward end of the bearing boss 5 and normally holding the coupling tongue 10 within the socket or recess 11 of the section 6 when the parts are to be maintained in driving relation.

The shaft-section 6 carries intermediate its thrust-collar 12 and its rearward end a pulley 17 fixed thereon by means of a set-screw 18, said pulley being provided with flanges 19 at the edges and with the transverse grooves or recesses 20 in its face to accommodate the flexible belt encircling the same, which, as herein represented, is formed of a series of convolutions 21 of a continuous cord provided with spaced clamping bands 22 at intervals corresponding with the spacing of the grooves 20 in the pulley. The belt 21 encircles a pulley 24 mounted upon the rearward end of the lower or driven shaft 23 and provided with the edge flanges 25 and transverse grooves 26 in its face. The pulley 24 is loosely mounted upon its supporting shaft 23 between two fixed driving collars 27, secured upon the shaft by means of set-screws 28, and each provided with a diametrical rib or tongue 29 entering similarly disposed grooves 30 in the opposite faces of the pulley 24 by means of which the latter is caused to rotate with the collars 27 and their supporting shaft.

The pulley 24 is formed upon one side, and preferably in line with the grooves 30, with an enlargement 31 of the central bore in which the shaft is normally disposed to enable the pulley under certain circumstances to rise to a position eccentric to the shaft. This lower pulley is formed with a diametrical aperture 32 which is entered by a plug 33 whose conical operative end enters a longitudinal groove 34 in the shaft 23, and the plug 33 is forced inwardly toward the shaft by means of a thrust-screw 35 tapped into the pulley from one side, with its conical point entering a corresponding lateral hole in the plug 33. When the screw 35 is in operative position, as represented in Fig. 1, the point of the plug 33 is forced within the groove 34 in the shaft 23 and the wall of the aperture in the pulley is seated at its opposite side firmly upon the top of the shaft 23, but when the screw 35 is withdrawn the plug 33 is permitted to be retracted so as to permit the pulley to rise by reason of the clearance for the lower side of the shaft 23 afforded by the enlargement 31.

Access to the screw 35 is provided for a suitable tool through the aperture 36 at the base of the upright portion 2 of the bracket-arm, while similar access is provided at the top of the bracket-arm through the hole 37 closed by means of the usual removable cap 38. Adjacent its rearward bearing 39 the lower shaft 23 is provided with a thrust collar 40 secured in position by means of the set-screw 41.

In sewing machines, and particularly in such class of machines provided with stitch-forming mechanism adapted to produce the chain-stitch seam, it is of considerable importance that, after the upper and lower shafts have been once adjusted for proper timing their relation shall not be disturbed. As will be readily observed, as explained more fully in the United States Patent to A. Steward, No. 667,830, of February 12, 1901, the transverse clamp-members 22 act in conjunction with the flexible composite band 21 and the grooved faced pulleys 17 and 24 to preserve the initial timing after such parts are operatively arranged in the original assemblage of the sewing machine parts, but in the renewal of the connecting belts the timing of the shafts is likely to be disturbed unless some special means are provided for maintaining their initial relation.

In the present machine, the shaft-section 6 is provided with a transverse conical hole 42 in which may be temporarily inserted the conical end of a pin 43 introduced through a lateral aperture in the bracket-arm, while a corresponding conical hole 44 is provided in the lower shaft 23 into which is correspondingly inserted the conical end of a pin 45 introduced through a suitable aperture in the base or work-supporting arm of the machine frame; the pins 43 and 45 being allowed to remain in the respective holes in the upper and lower shafts only during the changing of the belts.

When a composite belt of the class described becomes worn, or its effectiveness is otherwise impaired by long use, it may be readily withdrawn and replaced by a new belt by setting the shafts so that their holes 42 and 44 will register with the lateral apertures in the surrounding portions of the frame, and the pins 43 and 45 then inserted to lock the shafts from further movement. The set-screw 16 is now loosened and the driving section 7 of the main-shaft withdrawn, the collar 14 being removed or shifted upon the rearward end of the shaft-section 6. The set-screw 35 in the lower pulley is then withdrawn to loosen the pulley upon its shaft, and the belt slightly lifted to enable it to clear the rearward confining flange 19, the lower pulley readily yielding upwardly for such action, and the belt is then disengaged from the lower pulley and withdrawn between the rearward end of the shaft-section 6 and the bearing boss 5 through the opening 37 at the top of the arm. A new belt is introduced through said opening and applied to the pulleys by operations reciprocal to those described for the removal of the old belt, and after the parts are readjusted, the holding pins 43 and 45 are withdrawn and the machine is then in readiness for operation, the proper timing of its operative parts being assured by the locking of the upper and lower shafts in their initial relation.

While the present improvement is shown herein in connection with grooved-faced pulleys and a flexible belt or band with cross-bars 22 adapted to register with the grooves of the pulleys, it is evident that the improvement is as fully applicable to machines employing perforated belts and pin pulleys, or any other form of driving connection suitable for maintaining a fixed relation between the driving and driven shafts, whether the latter receive from the former corresponding speeds or multiple rotations for each rotation of the driving member. It is also obviously immaterial what form of coupling be used between the two sections of the driving shaft, so long as they are operatively connected for transmission of motion from one to the other.

Having thus set forth the nature of the invention what I claim herein is:—

1. In a machine of the class described, the combination with the frame provided with spaced bearings, and a laterally closed housing surrounding the adjacent ends of said bearings and provided with an aperture for access thereto, and a cover-plate for said aperture, of a shaft comprising two abutting and endwise separable sections each mounted in one of said bearings and provided with means whereby an end of the one may be coupled with the adjacent end of the other of the shaft-sections, a pulley mounted upon the second-named shaft-section, and an endless belt encircling said pulley and adapted to transmit power from said shaft to a distant shaft.

2. In a machine of the class described, the combination with the frame provided with alined spaced primary bearings and a secondary bearing out of alinement with said spaced bearings with a laterally closed housing surrounding the adjacent ends of said spaced bearings and one of the ends of the other of said bearings and provided with means for access thereto, of a shaft comprising separate abutting sections each mounted in one of said alined bearings with an end of the one coupled to the adjacent end of the other, one of said shaft-sections being capable of endwise movement in its respective bearing, a second shaft mounted in said secondary bearing, pulleys mounted respectively upon the second-named shaft-section and the second shaft, one of which pulleys is movable upon its shaft, means for securing it in fixed relation thereon, and a belt encircling said pulleys and adapted to transmit power from the one to the other.

3. In a machine of the class described, the combination with the frame provided with spaced bearings, of a shaft comprising separate abutting sections each mounted in one of said bearings with an end of the one coupled to the adjacent end of the other, one of said shaft-sections being capable of endwise movement in its respective bearing, a second shaft, pulleys mounted respectively upon the second-named shaft-section and the second shaft, one of which pulleys is movable transversely of its shaft, means for securing it in fixed relation thereon, and a belt encircling said pulleys and adapted to transmit power from the one to the other.

4. In a machine of the class described, the combination with the frame provided with spaced bearings, of a shaft comprising abutting and endwise separable sections each mounted in one of said bearings and provided with means whereby an end of the one may be coupled with the adjacent end of the other of the shaft sections, a second shaft, pulleys mounted respectively upon the second-named shaft-section and the second shaft, one of which pulleys is movable upon its shaft, means for securing it in fixed relation thereon, a belt encircling said pulleys and adapted to transmit power from the one to the other, and means independent of said pulleys and the engaging belt for simultaneously locking said shafts from rotation in fixed relation with each other.

5. In a machine of the class described, the combination with the frame provided with spaced bearings, of a shaft comprising abutting and endwise separable sections each mounted in one of said bearings and provided with means whereby an end of the one may be coupled with the adjacent end of the other of the shaft-sections, a second shaft, pulleys mounted respectively upon the second-named shaft-section and the second shaft, one of which pulleys is movable upon its shaft, means for securing it in fixed relation thereon, a belt encircling said pulleys and adapted to transmit power from the one to the other, and locking pins adapted to be introduced through the frame and into holes in the shaft-section and shaft carrying the pulleys, for maintaining said shafts in fixed relation when the belt is disengaged from said pulleys.

6. In a machine of the class described, the combination with the frame formed with a housing cavity and provided with spaced bearings disposed within the latter, of a shaft comprising an endwise immovable driven section and an endwise movable driving section each mounted in one of said bearings and provided with means whereby the adjacent ends of said sections may be coupled together within said housing cavity, a second shaft, pulleys mounted respectively upon the end portions of the driven shaft-section and the second shaft and inclosed by said housing cavity, and a belt encircling said pulleys and adapted to transmit power from the one to the other.

7. In a machine of the class described, the combination with the frame provided with spaced bearings, of a shaft comprising abutting and endwise separable sections each mounted in one of said bearings and provided with means whereby the adjacent ends of the shaft-sections may be coupled together, a second shaft, a pulley fixed upon the second-named shaft-section, a pulley mounted upon the second shaft and having its bore enlarged upon one side, an endwise movable thrust-pin disposed substantially in radial relation to the second shaft and passing through said enlargement for engagement with the shaft, and a belt encircling said pulleys and adapted to transmit power from the one to the other.

8. In a machine of the class described, the combination with the frame provided with spaced bearings, of a shaft comprising abutting and endwise separable sections each mounted in one of said bearings and provided with means whereby the adjacent ends of the shaft-sections may be coupled together, a second shaft, a pulley fixed upon the second-named shaft-section, a pulley mounted upon the second shaft and having its bore enlarged upon one side, an endwise movable thrust-pin disposed substantially in radial relation to the second shaft and passing through said enlargement for engagement with the shaft, a thrust-screw applied to the pulley transversely of said thrust-pin and adapted to force the same into engagement with the shaft, and a belt encircling said pulleys and adapted to transmit power from the one to the other.

9. In a machine of the class described, the combination with the frame provided with spaced bearings, of a shaft comprising abutting and endwise separable sections each mounted in one of said bearings and provided with means whereby the adjacent ends of the shaft-sections may be coupled together, a second shaft, a pulley fixed upon the second-named shaft-section, a pulley mounted upon the second shaft and provided with parallel diametrical grooves in the opposite faces, and formed with a central bore enlarged upon one side in the direction of said grooves, a pair of thrust-collars fixed upon said shaft and provided upon the adjacent faces with diametrical tongues entering the grooves in said pulley, an endwise movable thrust-pin disposed in substantially radial relation to the second shaft and passing through said enlargement for engagement with the shaft, and a belt encircling said pulleys and adapted to transmit power from the one to the other.

In testimony whereof, I have signed my name to this specification, in the presence of two subscribing witnesses.

GEORGE E. MOLYNEUX.

Witnesses:
   JOSEPH F. JAQUITH,
   HENRY J. MILLER.